United States Patent
Feuerrohr

(10) Patent No.: US 8,434,584 B2
(45) Date of Patent: May 7, 2013

(54) SYNCHRONOUS MACHINE

(75) Inventor: Lin Feuerrohr, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/148,331

(22) PCT Filed: Dec. 7, 2009

(86) PCT No.: PCT/EP2009/066479
§ 371 (c)(1),
(2), (4) Date: Nov. 7, 2011

(87) PCT Pub. No.: WO2010/088983
PCT Pub. Date: Aug. 12, 2010

(65) Prior Publication Data
US 2012/0043155 A1 Feb. 23, 2012

(30) Foreign Application Priority Data
Feb. 6, 2009 (DE) .......................... 10 2009 000 681

(51) Int. Cl.
*B62D 5/04* (2006.01)
(52) U.S. Cl.
USPC ....................................................... 180/443
(58) Field of Classification Search ............ 310/156.53, 310/216.092, 195, 67, 156, 198
See application file for complete search history.

(56) References Cited

U.S. PATENT DOCUMENTS

| | | | |
|---|---|---|---|
| 5,164,622 A | 11/1992 | Kordik | |
| 5,642,013 A | 6/1997 | Wavre | |
| 6,144,137 A * | 11/2000 | Engelbert | 310/431 |
| 7,843,102 B1 * | 11/2010 | Wyremba | 310/179 |
| 2010/0187941 A1 * | 7/2010 | Roth et al. | 310/203 |
| 2010/0289370 A1 | 11/2010 | Roth et al. | |

FOREIGN PATENT DOCUMENTS

| | | | |
|---|---|---|---|
| EP | 0909009 A1 | | 4/1999 |
| EP | 909009 A1 | * | 4/1999 |
| EP | 1555734 A1 | * | 7/2005 |
| FR | 2802724 A1 | | 6/2001 |

OTHER PUBLICATIONS

PCT/EP2009/066479 International Search Report.

* cited by examiner

*Primary Examiner* — Tashiana Adams
(74) *Attorney, Agent, or Firm* — Michael Best & Friedrich LLP

(57) ABSTRACT

The invention relates to an electric machine (1) comprising: —a rotor (4) having 14 rotor poles (8) which is arranged rotatably about a central axis and—a stator (2) having 12 stator teeth (3) which project in a radial direction relative to the central axis from the stator (2) in the direction of the rotor (4), characterized in that each of the stator teeth (3) is surrounded by a stator coil (9) which surrounds only one of the stator teeth.

20 Claims, 5 Drawing Sheets

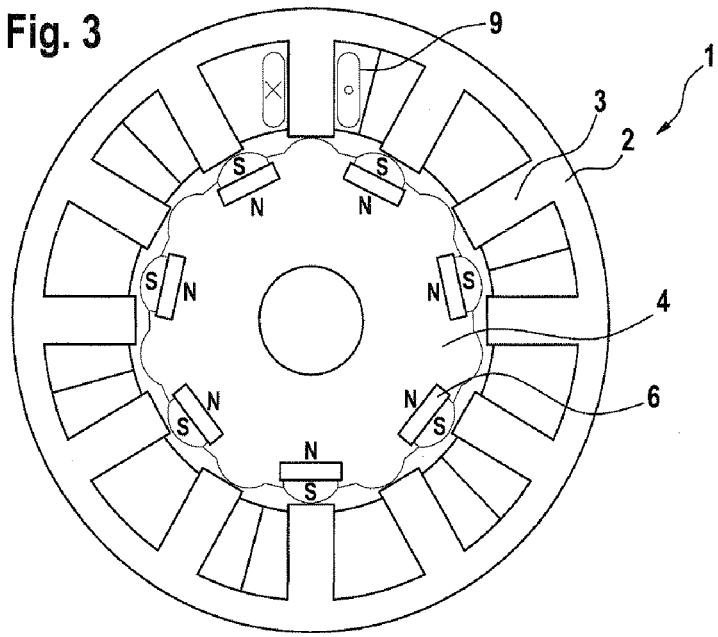
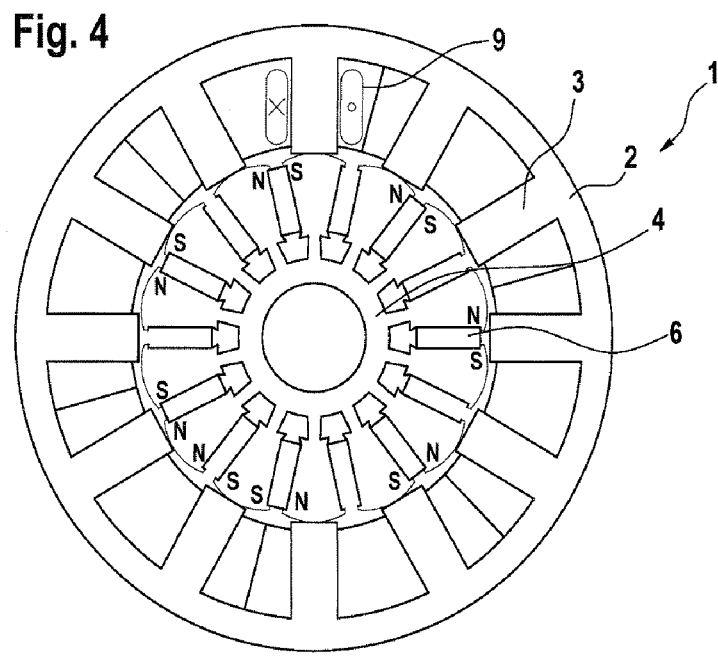

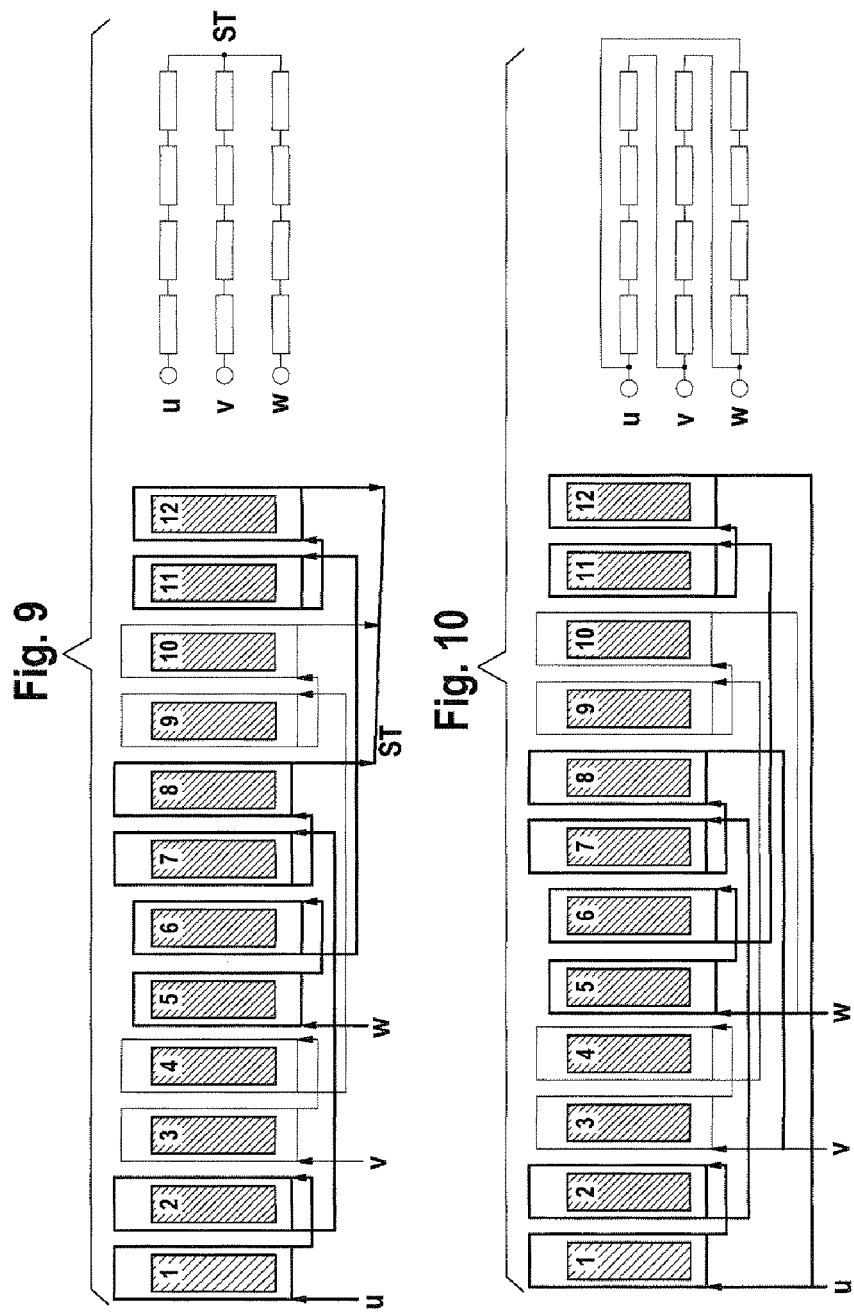

SYNCHRONOUS MACHINE

BACKGROUND OF THE INVENTION

The invention relates to an electrical machine having 12 stator teeth and 14 rotor poles, in particular for use in electrical steering aids.

In the case of electrical drives for steering systems with electromechanical assistance for use in motor vehicles, it is necessary for the fluctuations in the drive torque produced in the shaft to be as small as possible. Electrically commutated synchronous motors with permanent magnet excitation are normally used for applications such as these, because these motors have advantages owing to their power density, their efficiency and their control capability.

However, in the case of electronically commutated synchronous motors, harmonics result in so-called harmonic torques, which can lead to major oscillations in the torque. Drives such as these must therefore be designed to reduce these harmonics as much as possible or to keep their effects on the torque profile as small as possible. Furthermore, in the case of synchronous motors such as these, torque fluctuations occur not only when on load but also when no current is flowing the stator windings, and this is referred to as the cogging torque. Particularly in the case of small machines, it is impossible, because of the space conditions, to introduce a finely distributed winding into the armature, in order to produce an ideal sinusoidal air-gap field. In the case of small machines, corresponding harmonics therefore have to be expected in the air gap. It would therefore be advantageous to design the machines such that these harmonics have as little effect as possible on the torque.

It is also desirable to reduce the failure probability of an electrical machine such as this, and to keep the resultant braking torques comparatively low in the event of a fault, for example in the event of a short in the winding. These braking torques occur since, in contrast to machines with electrically excited fields, it is impossible to switch off the magnetic field in machines with permanent-magnet excitation. Electrical machines having 12 stator teeth and 8 rotor poles are already known, but these do not ensure adequate torque quality during normal fault-free operation.

Furthermore, an electrical machine having 18 stator teeth and 8 rotor poles is known, but this has the disadvantage that the electrical machine has a distributed winding in which the coil windings of different phases cross in the end winding, and coil sides of different phases are located in the stator slots. Shorts can therefore occur between different phases in the end windings and in the slot.

Furthermore, electrical machines having 12 stator teeth and 10 rotor poles are known, which allow smaller cogging torques in comparison to electrical machines having 12 stator teeth and 8 rotor poles, but produce a lower torque quality in comparison to an electrical machine having 18 stator teeth and 8 rotor poles.

Electrical machines having 12 stator teeth and 8 or 10 rotor poles generally have tooth heads in order to achieve small cogging torques. These make it more difficult to fit the coil windings to the stator teeth, and in general require split stators for a compact stator configuration, in order to allow a high conductor filling factor to be achieved for the coil windings. Split stators lead to asymmetries because of dimensional tolerances, as a result of which poor cogging torques can occur.

SUMMARY OF THE INVENTION

The object of the present invention is to provide an electrical machine which has small cogging torques, little torque ripple and little sensitivity to discrepancies from symmetry.

According to a first aspect, an electrical machine is provided. The electrical machine has a rotor having 14 poles, which is arranged such that it can rotate about a center axis, and a stator having 12 stator teeth, which project in a radial direction with respect to the center axis of the stator in the direction of the rotor. Each of the stator teeth is surrounded by at most one stator coil, which surrounds only the relevant stator tooth.

When using a topology of an electrical machine having 12 stator teeth and 14 rotor poles, a very small cogging torque and little torque ripple were found. This topology makes it possible for the winding to be in the form of a single-tooth winding, thus avoiding the possibility of shorts being created at crossing points where stator coils cross over. This ensures greater reliability.

In particular, at least one of the stator teeth is not broadened in the tangential direction at its end facing the rotor. This topology allows the stator teeth of the electrical machine to be designed without a broadened tooth head, as a result of which the coil winding can be prefabricated and plugged onto the stator tooth. This considerably simplifies the production of an electrical machine such as this.

The electrical machine preferably has a single-tooth winding configuration, thus making it possible to avoid coil windings of different phases crossing over.

The stator coils can be arranged such that they each surround one stator tooth.

In particular, a part or each of the rotor poles can be provided with a permanent magnet.

According to one embodiment, the permanent magnets can each be arranged in or on one of the rotor poles and can be aligned such that their magnetic poles each face in the radial direction.

Permanent magnets can be arranged in or on each of the rotor poles, or the permanent magnets in the rotor poles can be arranged only in every second rotor pole in the sense of a consequent-pole arrangement.

Furthermore, the permanent magnets can each be arranged in a pocket between two rotor poles and can be aligned such that their magnetic poles face in a tangential direction.

According to one embodiment, permanent magnets can be arranged between all adjacent rotor poles, or the permanent magnets can be arranged only in every second pocket, in the sense of a consequent-pole arrangement.

According to one embodiment, an outer surface, facing the stator, of the rotor poles may have greater curvature than the circle curvature which is governed by the distance between the outer surface and the center axis of the rotor.

Furthermore, the outer surface of the rotor poles may have a Richter contour or a circular contour with a radius which is less than the distance between the outer surface and the center axis of the rotor.

According to one embodiment each of the stator teeth may be provided with a stator coil, wherein two adjacent stator coils are in each case connected in series with one another to form a stator coil pair, wherein the stator coil pair and a stator coil pair opposite the stator coil pair are associated with one phase.

Furthermore, the stator coil pairs which are associated with one phase are connected in series or may be connected in parallel with one another, and may be connected in a star-point circuit to a star point or to a delta circuit.

Furthermore, one of the stator coil pairs which are associated with one phase can be in each case connected to a dedicated star point, in order to form a star point circuit.

According to a further aspect, the above electrical machine can be used in a steering system of a motor vehicle.

BRIEF DESCRIPTION OF THE DRAWINGS

Embodiments of the electrical machine will be explained in more detail in the following text with reference to the attached drawings, in which:

FIG. 3 shows an electrical machine having a consequent-pole arrangement;

FIG. 4 shows an electrical machine having a consequent-pole arrangement and spoke magnets;

FIG. 9 shows a plan view of the stator teeth provided with stator coils, from the center axis of the rotor, and a circuit illustration for a star-point circuit with a star point;

FIG. 10 shows a plan view of the stator teeth provided with stator coils, from the center axis of the rotor, and a circuit illustration for a delta circuit.

DETAILED DESCRIPTION

Figure 1:
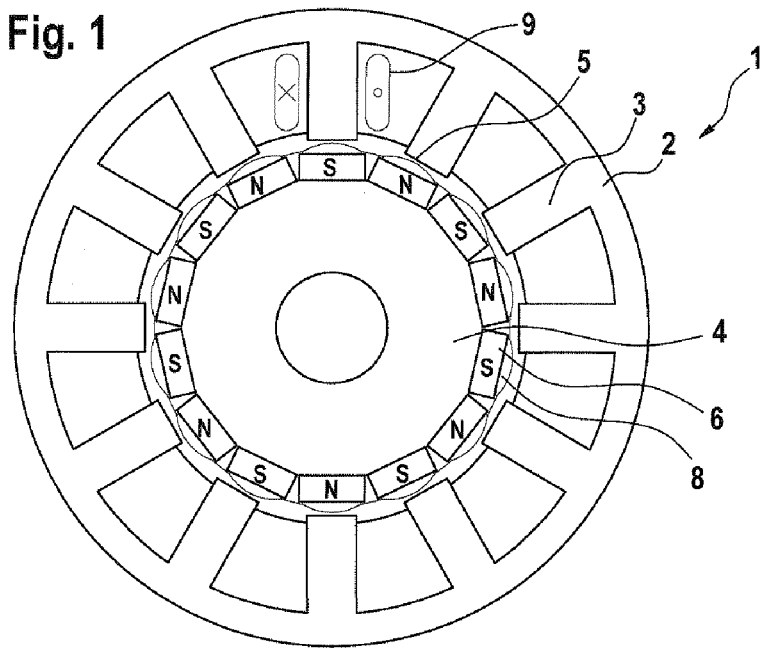
FIG. 1 shows an electrical machine having 12 stator teeth and 14 rotor poles with buried magnets.

FIG. 1 shows a cross section through an electrical machine 1. The electrical machine has a stator 2, which surrounds a rotor 4 which can rotate about a center axis M. In the illustrated exemplary embodiment, the electrical machine is in the form of a synchronous machine.

The stator 2 has 12 stator teeth 3 which, projecting in the radial direction from a stator body of the stator 2, are directed inward in the direction of the rotor 4. This means that the stator teeth 3 are aligned in the direction of the center axis M of the electrical machine 1. The stator teeth 3 are uniformly separated from one another in the tangential direction, that is to say they are arranged with the same offset angle, and in the interior of the stator body.

The rotor 4 is arranged such that it can rotate about the center axis M and has the permanent magnets 6. The permanent magnets 6 form rotor poles 8 and are arranged such that their magnetic poles run in the radial direction. Adjacent permanent magnets 6 have opposite polarity. The number of rotor poles 8 in the rotor 4 shown is 14. As illustrated in the embodiment of FIG. 1, the permanent magnets 6 may be in the form of buried permanent magnets 6, which are located in the interior of a corresponding rotor pole 8 and are covered on the outside in the radial direction by material of the rotor pole 8. Alternatively, the permanent magnets 6 may be in the form of surface magnets, which are embedded in recesses in the outer surface of the rotor 4, such that the respective pole of the permanent magnet 6 is exposed on the outside in the radial direction. It is advantageous to use permanent magnets 6 buried in the rotor 4 since this allows simple and low-cost magnet shapes to be used, for example magnets with flat surfaces, thus furthermore making it possible to ensure a simple rotor design, without bindings and with corrosion protection.

The stator teeth 3 are surrounded by stator coils 9 which each surround one stator tooth 3. For the sake of clarity, FIG. 1 shows only one stator coil 9. The provision of one stator coil 9 on each stator tooth 3 makes it possible to avoid intersecting or crossing coil windings in the stator coils 9. This reduces the risk of shorts between the stator coils 9, since only two coil sides are arranged in one slot between two stator teeth 3.

The inner end of each stator tooth 3 has a termination which is referred to as a tooth head 5. The tooth head 5 is used to provide a surface through which the majority or the greatest possible proportion of the magnetic flux is absorbed by permanent magnets 6 which are arranged in the rotor 4. In the present exemplary embodiment, the electrical machine 1 has stator teeth 3 which do not have a broadened tooth head 5, thus making it possible to fit the coil windings 9 to the stator teeth 3 easily. In other words, the stator teeth 3 are in the form of cylindrical or cuboid projections on the stator body.

Alternatively or additionally, it is possible to provide the rotor poles 8 with an external contour in order to achieve a flux density distribution which as sinusoidal as possible over the rotor pole 8, as a result of which the magnetic flux can be chosen to be as high as possible while at the same time avoiding the occurrence of saturation of the magnetic flux in the stator tooth. One possibility is for the rotor poles 8 to be in the form of so-called sinusoidal poles. The sinusoidal poles lead to air-gap widening at the pole edges. According to Richter, the formula for the rotor external radius is:

$$R = \sqrt[p]{\frac{F_0}{\cos(p \cdot \varphi)} + \sqrt{R_1^{2p} + \frac{F_0^2}{\cos^2(p \cdot \varphi)}}}$$

$$F_0 = \frac{(R_1 \pm \delta_0)^{2p} - R_1^{2p}}{2 \cdot (R_1 \pm \delta_0)^p}$$

where R is the radius at the solid angle φ (pole shape contour), p is the number of pole pairs, φ is the solid angle, $R_1$ is the stator radius (internal diameter of the internal rotor and vice versa), and $\delta_0$ is the minimum air gap at the pole center. This results in the outer surface of the rotor 4 having a corrugated shape, with the areas of the highest peaks of each rotor pole 8 in general corresponding to center axes of the rotor poles 8, which run in the radial direction.

For simplicity, instead of the above equation according to Richter, a function according to 1/cos (pφ) can be used for the air-gap widening. The two equations differ only slightly from one another in the relevant range. The contour for the air gap produces an approximately sinusoidal air-gap field through the rotor, making it possible to considerably reduce the cogging torques on no load and the harmonic torques when on load.

Alternatively, the pole shape contour may also be approximated by an external contour which corresponds to an arc contour with a constant contour radius. In this case, the contour radius is less than the radius of the outer surface of the rotor 4, thus resulting in a gap between two adjacent rotor poles 8.

It is also possible, on the basis of a consequent-tooth arrangement, to provide only every second stator tooth 3 with a corresponding coil winding 9. This has the advantage that two coil sides are not arranged at the same time in a slot which is formed between two stator teeth 3. In the case of a consequent-tooth arrangement, the magnetic flux through that stator tooth 3 which is not provided with a stator coil 9 corresponds to the magnetic return path for the adjacent stator tooth 3 which is provided with a stator coil 9.

In a consequent-tooth arrangement of the stator 2, in which only every second stator tooth is wound as a so-called main tooth, the teeth widths (in the tangential direction with respect to the center axis M) of the wound main tooth and of one of the adjacent unwound auxiliary or intermediate teeth may differ. In particular, it is possible for the wound main teeth to have a tooth width of between 30 and 50 degrees, and for the auxiliary teeth to have a tooth width which corresponds to an angle range between 10 and 30 degrees. In particular, the tooth width of the main teeth may correspond to an angle region of 40 degrees, and that of the auxiliary teeth may correspond to an angle region of 20 degrees.

Figure 2:
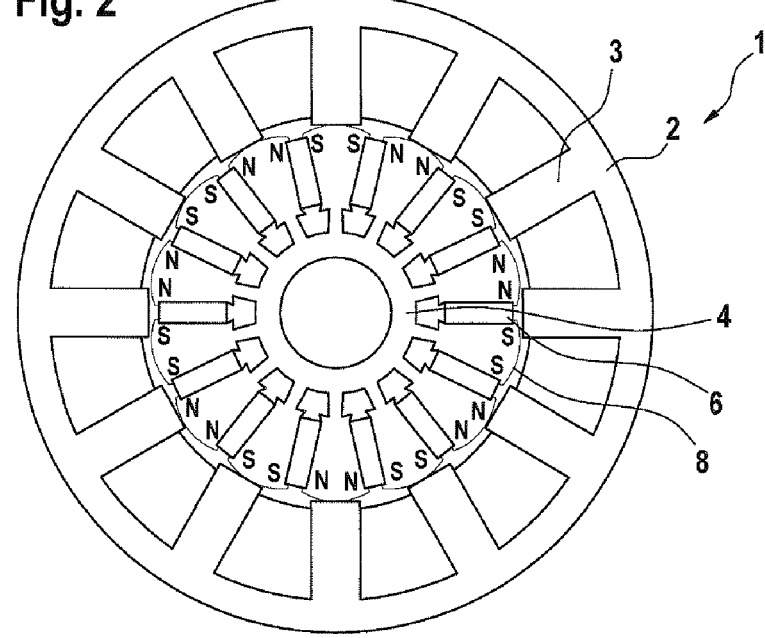
FIG. 2 shows an electrical machine having spoke magnets and having sinusoidal poles according to Richter.

FIG. 2 illustrates a further synchronous motor in which, instead of the buried permanent magnets 6, the permanent magnets are in the form of spoke magnets. The spoke magnets are each arranged in pockets 12 between two adjacent rotor poles 8 of the rotor 4, with the permanent magnets 6 in two respectively adjacent pockets 12 being aligned such that they have essentially opposite polarity to one another, in the tangential direction. In the case of a spoke magnet arrangement as well, the rotor poles 8 may have a pole shape contour corresponding to a sinusoidal contour or an arc contour.

An electrical machine having split magnets, that is to say having spoke magnets, has the advantage that the flux from the magnets can be concentrated toward the pole, and a greater pole flux can be produced across the air gap. It is therefore possible to produce a greater torque with the same physical size and with the same magnetic fluxes produced by permanent magnets.

FIG. 3 illustrates a consequent-pole arrangement for the rotor 4, in which only every second rotor pole is provided with a buried permanent magnet 6, while the rotor pole 8 which is located between two rotor poles 8 formed by the permanent magnets 6 has no permanent magnets 6. In the case of a consequent-pole arrangement such as this, the permanent magnets 6 have the same polarity with respect to their radial alignment.

FIG. 4 shows an electrical machine having a consequent-pole arrangement of spoke magnets. This embodiment corresponds to that in FIG. 2 apart from the fact that not every pocket 12 is provided with a permanent magnet 6. In the embodiment illustrated in FIG. 4, only every second pocket 12 is provided with a permanent magnet 6. In order to improve the mechanical robustness, it is worthwhile filling those pockets 12 which are not provided with a permanent magnet 6 with magnetically inactive material. These pockets 12 which are not provided with a permanent 6 can also be used for further structural parts.

The invention has been described above with reference to electrical machines with an internal rotor. However, the principle can also be applied to electrical machines having an external rotor.

As described above, if the stator coils 9 are in the form of single-tooth windings, it is possible for the design to preclude shorts between the conductors of different phases. This is particularly true when an adequate isolation separation is ensured between the coil sides of adjacent stator coils 9 which are located in the same slot, or an isolation element is provided between the coil sides.

Figure 5:
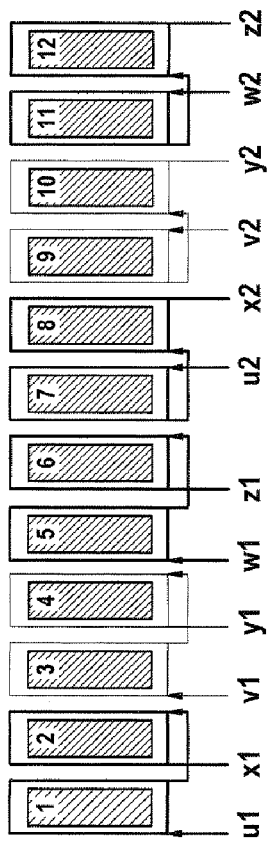
FIG. 5 shows a plan view of the stator teeth provided with stator coils, from the center axis of the rotor.

FIG. 5 illustrates the 12 stator teeth 3, which are arranged in a circular shape in the electrical machine 1, in the form of a plan view from the center axis M in the radial direction outward, on a plane. The illustrated windings are stator coils 9 of a three-phase synchronous motor. Four stator coils 9 are therefore associated with each phase. The stator coils 9 for one phase are arranged such that two stator coils 9 are in each case arranged on mutually adjacent stator teeth 3, and the other two stator coils 9 are arranged on the opposite stator teeth 3 in the stator 2. For the present exemplary embodiment, this means that the stator coils 9 on the stator teeth 3 with the numbers 1, 2, 7 and 8, the stator coils 9 on the stator teeth 3 with the numbers 3, 4, 9 and 10, as well as the stator coils 9 on the stator teeth 3 with the numbers 5, 6, 11 and 12 are each associated with one phase.

The stator coils 9 of a stator coil pair of adjacent stator coils 9 which are associated with the same phase are wound in opposite senses. Furthermore, the respectively two adjacent stator coils 9 of one phase are each wound in the same sense on the first six stator teeth 3 numbered 1-6, while two stator coils 9 of one phase are each wound in the opposite sense to the stator coils 9 of the stator teeth 3 numbered 1-6 on adjacent stator teeth 3 of the stator 3 numbered 7-12. In other words, two mutually opposite stator coils 9 for one phase in the rotor 4 are wound in opposite senses.

Figure 6:
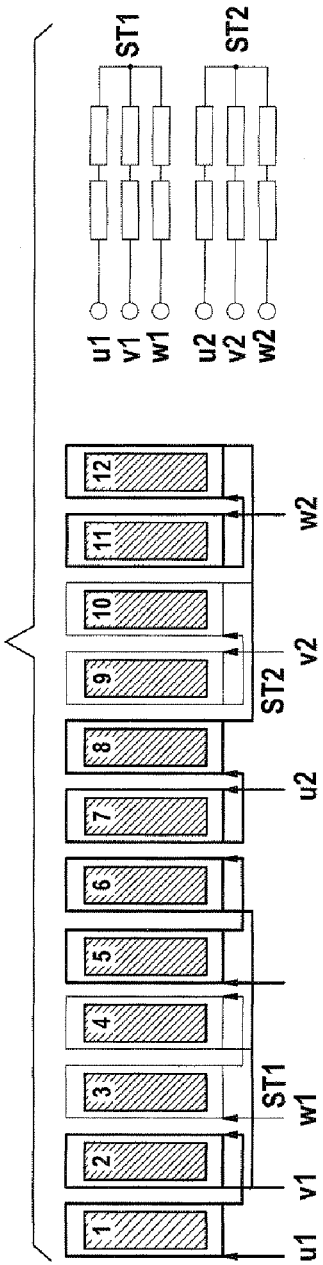
FIG. 6 shows a plan view of the stator teeth provided with stator coils, from the center axis of the rotor, and a circuit illustration for a star-point circuit with a plurality of star points.

FIG. 6 shows circuitry of the stator coils 9 in the form of a plan view of the stator teeth 3 and in the form of a schematic illustration, in which the stator coils 9 are connected to one another in a star-point circuit, with each of the two stator coils 9 in one stator coil pair being connected in series, and with the stator coils 9 which are connected in series in this way being connected to one another on the stator teeth 3 numbered 1-6 in a star-point circuit via a first star point ST1, and with the stator coils 9 in the stator coil pair on the stator teeth 3 numbered 7-12 correspondingly being connected to one another via a second star point ST2. In addition, the stator coil pairs which are associated with the first star point ST1, and those which are associated with the second star point ST2, are operated separately from one another via first phase connections u1, v1, w1 and u2, v2, w2 respectively.

Figure 7:
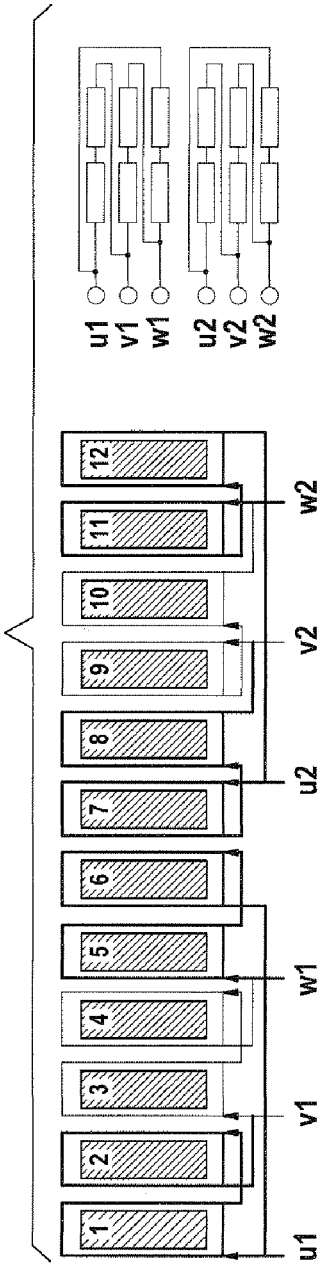
FIG. 7 shows a plan view of the stator teeth provided with stator coils, from the center axis of the rotor, and a circuit illustration for a delta circuit with two separate three-phase systems.

FIG. 7 shows alternative circuitry for the stator coil pairs in two separate delta circuits, in the form of a plan view of the stator teeth 3 and in the form of a schematic illustration, that is to say the stator coil pairs on the stator teeth 3 numbered 1-6 are connected in a delta circuit, and the stator coil pairs on the stator teeth 3 numbered 7-12 are connected in a delta circuit that is electrically isolated from the former. In addition, the stator coil pairs in the first delta circuit and those in the second delta circuit are operated separately from one another via first phase connections u1, v1, w1 and u2, v2, w2 respectively.

Figure 8:
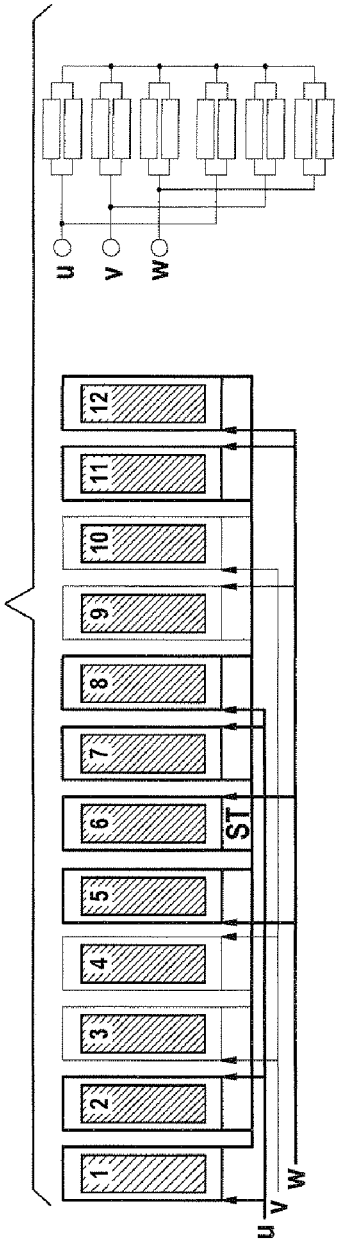
FIG. 8 shows a plan view of the stator teeth provided with stator coils, from the center axis of the rotor, and a circuit illustration for a star-point circuit with a star point.

FIG. 8 shows the circuitry of the stator coil pairs on the stator teeth 3 in a common star-point circuit in the form of a plan view of the stator teeth 3, and in the form of a schematic illustration, wherein each of the stator coil pairs with parallel-connected stator coils 9 is connected to the common star point ST, and those stator coil pairs which are associated with the same phase are connected in parallel with one another and are operated via a common phase connection u, v, w. Instead of connecting the stator coils 9 in the stator coil pairs in parallel, it is also possible to provide for each of the stator coil pairs to be connected in series.

FIG. 9 shows a plan view of the stator teeth 3 and, in the form of a schematic illustration, further circuitry for the stator coils 9 in a star-point circuit, in which those stator coil pairs which are associated with one phase are connected in series, and the series circuits formed by the two stator coil pairs for one phase are each connected to a common star point ST, in order to form a star-point circuit.

FIG. 10 shows a plan view of the stator teeth 3 and, in the form of a schematic illustration, the circuitry of the stator coil pairs in the form of a delta circuit, with those stator coil pairs which are associated with one phase being connected in series with one another. Alternatively, it is also possible to connect the stator coil pairs in parallel with one another in each case.

What is claimed is:

1. An electrical machine (1) comprising:
   a rotor (4) having 14 rotor poles (8), the rotor being arranged to be rotatable about a center axis, and
   a stator (2) having 12 stator teeth (3) which project in a radial direction with respect to the center axis in the direction of the rotor (4), characterized in that
   wherein each of the stator teeth (3) is provided with a stator coil (9), wherein two adjacent stator coils (9) are in each case connected in series with one another to form a stator coil pair,
   wherein one of the stator coil pairs which are associated with one phase is in each case connected to a dedicated star point, in order to form a star point circuit.

2. The electrical machine (1) as claimed in claim 1, wherein at least one of the stator teeth (3) is not broadened in a tangential direction at an end facing the rotor (4).

3. The electrical machine as claimed in claim 1, wherein a part or each of the rotor poles (8) is provided with a permanent magnet (6).

4. The electrical machine as claimed in claim 3, wherein the permanent magnets (6) are each arranged in or on one of the rotor poles (8) and are aligned such that their magnetic poles each face in the radial direction.

5. The electrical machine as claimed in claim 3, wherein permanent magnets (6) are arranged in or on each of the rotor poles (8), or the permanent magnets (6) in the rotor poles (8) are arranged only in every second rotor pole (8) in a consequent-pole arrangement.

6. The electrical machine as claimed in claim 3, wherein the permanent magnets (6) are each arranged in a pocket between two rotor poles and are aligned such that their magnetic poles face in a tangential direction.

7. The electrical machine as claimed in claim 6, wherein the permanent magnets (6) are arranged between all adjacent rotor poles (8).

8. An electrical machine (1) comprising:
   a rotor (4) having 14 rotor poles (8), the rotor being arranged to be rotatable about a center axis, and
   a stator (2) having 12 stator teeth (3) which project in a radial direction with respect to the center axis in the direction of the rotor (4),
   wherein each of the stator teeth (3) is surrounded by at most one stator coil (9), which surrounds only the relevant stator tooth, and
   wherein an outer surface, facing the stator (2), of the rotor poles (8) has greater curvature than a circle curvature which is governed by a distance between the outer surface and the center axis of the rotor (4).

9. The electrical machine as claimed in claim 8, wherein the outer surface of the rotor poles (8) has a Richter contour or a circular contour with a radius which is less than the distance between the outer surface and the center axis of the rotor (4).

10. An electrical machine (1) comprising:
    a rotor (4) having 14 rotor poles (8), the rotor being arranged to be rotatable about a center axis, and
    a stator (2) having 12 stator teeth (3) which project in a radial direction with respect to the center axis in the direction of the rotor (4),
    wherein each of the stator teeth (3) is surrounded by at most one stator coil (9), which surrounds only the relevant stator tooth,
    wherein each of the stator teeth (3) is provided with a stator coil (9), wherein two adjacent stator coils (9) are in each case connected in series with one another to form a stator coil pair, and wherein the stator coil pair and a stator coil pair opposite the stator coil pair are associated with one phase.

11. The electrical machine as claimed in claim 10, wherein the stator coil pairs which are associated with one phase are connected in series or are connected in parallel with one another, and are connected in a star-point circuit to a star point or to a delta circuit.

12. A steering system of a motor vehicle comprising an electrical machine as claimed in claim 1.

13. The electrical machine as claimed in claim 6, wherein the permanent magnets (6) are arranged only in every second pocket, in a consequent-pole arrangement.

14. The electrical machine (1) as claimed in claim 8, wherein at least one of the stator teeth (3) is not broadened in a tangential direction at an end facing the rotor (4).

15. The electrical machine (1) as claimed in claim 10, wherein at least one of the stator teeth (3) is not broadened in a tangential direction at an end facing the rotor (4).

16. The electrical machine as claimed in claim 8, wherein a part or each of the rotor poles (8) is provided with a permanent magnet (6).

17. The electrical machine as claimed in claim 16, wherein the permanent magnets (6) are each arranged in or on one of the rotor poles (8) and are aligned such that their magnetic poles each face in the radial direction.

18. The electrical machine as claimed in claim 16, wherein permanent magnets (6) are arranged in or on each of the rotor poles (8), or the permanent magnets (6) in the rotor poles (8) are arranged only in every second rotor pole (8) in a consequent-pole arrangement.

19. The electrical machine as claimed in claim 16, wherein the permanent magnets (6) are each arranged in a pocket between two rotor poles and are aligned such that their magnetic poles face in a tangential direction.

20. The electrical machine as claimed in claim 8, wherein the outer surface of the rotor poles (8) has a Richter contour or a circular contour with a radius which is less than the distance between the outer surface and the center axis of the rotor (4).

* * * * *